(12) United States Patent
Manner

(10) Patent No.: US 6,430,267 B2
(45) Date of Patent: Aug. 6, 2002

(54) PROCEDURE AND SYSTEM FOR EXECUTING AN ALARM FUNCTION

(75) Inventor: Juha-Pekka Manner, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/753,535

(22) Filed: Jan. 2, 2001

Related U.S. Application Data

(63) Continuation of application No. PCT/FI99/00629, filed on Jul. 15, 1999.

(30) Foreign Application Priority Data

Jul. 16, 1998 (FI) .................................................. 981626

(51) Int. Cl.$^7$ ............................................. H04M 11/04
(52) U.S. Cl. ........................ 379/37; 379/188; 379/200
(58) Field of Search ............................... 379/37, 38, 39, 379/45, 188, 189, 196, 197, 198, 199, 200

(56) References Cited

U.S. PATENT DOCUMENTS

| | | | |
|---|---|---|---|
| 4,369,339 A | 1/1983 | Castro et al. | |
| 4,446,334 A | 5/1984 | Groff | |
| 4,937,854 A | 6/1990 | Sarakas | |
| 4,953,202 A | * 8/1990 | Newell | ........................ 379/188 |
| 5,287,398 A | 2/1994 | Briault | |

FOREIGN PATENT DOCUMENTS

| | | |
|---|---|---|
| EP | 0 631 264 | 12/1994 |
| WO | WO 97/22200 | 6/1997 |

* cited by examiner

*Primary Examiner*—Stella Woo
(74) *Attorney, Agent, or Firm*—Altera Law Group, LLC

(57) ABSTRACT

The invention relates to a procedure and system for executing a personal alarm function by means of a telecommunication terminal in a telecommunication system comprising a telephone network, a telephone exchange connected to the telephone network, an intelligent network element connected to the telephone network and a telecommunication terminal connected to the telephone network. In the procedure of the invention, a hidden mode is defined in conjunction with a call made from the telecommunication terminal, the mode is verified in the intelligent network element in conjunction with the setup of each call and an alarm function is executed when the mode differs from the defined mode. The system of the invention comprises means for defining a hidden mode in conjunction with a call made from the telecommunication terminal, means in the intelligent network element for verifying the mode in conjunction with the setup of each call and means for executing an alarm function when the mode differs from the defined mode.

18 Claims, 1 Drawing Sheet

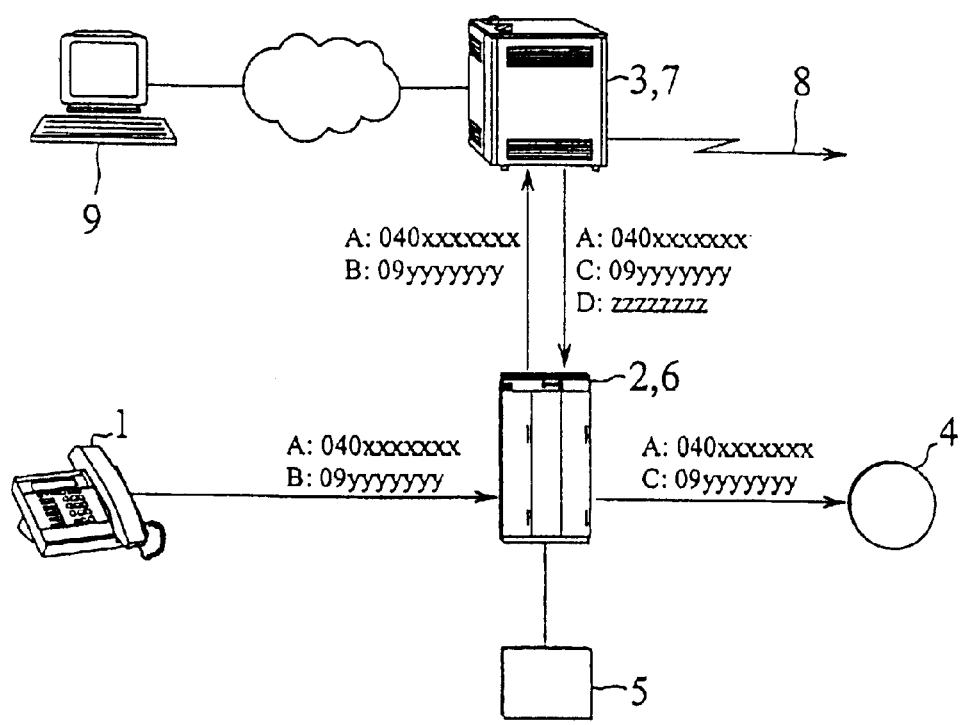

PROCEDURE AND SYSTEM FOR EXECUTING AN ALARM FUNCTION

This is a continuation of international application Ser. No. PCT/FI99/00629 filed Jul. 15, 1999.

The present invention relates to telecommunication systems. The invention concerns a procedure and system for executing a personal alarm on a telecommunication terminal.

BACKGROUND OF THE INVENTION

Personal safety is the object of increasing concern. An example is a DNA register designed for business executives, which has been developed in order that, in a capture situation, kidnappers need not cut any limbs to prove that a person has been captured. Ordinary citizens also often feel insecure. The telephone is a handy safety device, but e.g. in the event of a capture, it is not possible to call the police without the attempt being detected.

The object of the present invention is to eliminate the problem referred to above. A specific object of the present invention is to disclose a new type of procedure and system which can be used to make an alarm call without the caller or a person observing the call being able to realise that an alarm has been issued.

BRIEF DESCRIPTION OF THE INVENTION

The invention concerns a procedure for executing a personal alarm function by means of a telecommunication terminal in a telecommunication system. The telecommunication system comprises a telephone network, a telephone exchange connected to the telephone network, an intelligent network element connected to the telephone network and a telecommunication terminal connected to the telephone network. In the procedure, a hidden mode is defined in conjunction with a call made from the telecommunication terminal. In the intelligent network element, the mode is verified, i.e. the actions carried out by the user are compared during the setup of each call. If the mode differs from the defined mode, then an alarm function is executed.

In a preferred embodiment of the invention, the mode is defined as a safety code to be added in conjunction with the dialling of a telephone number. The safety code is preferably entered after a suitable number, e.g. after a complete telephone number dialled, or after each individual character or digit. In an embodiment, the safety code is input before a suitable digit, e.g. before the first digit of a telephone number or before a pre-agreed digit.

In an embodiment, the function works logically in the reverse order; an alarm is issued after the intelligent network element has detected a safety code. In this case, a safety code producing an alarm is added in conjunction with the dialling of a normal telephone number.

The verification of the mode can be managed by many different methods. In an embodiment, verification of the mode is activated and deactivated by means of the telecommunication terminal. Correspondingly, in an embodiment, activation and deactivation is accomplished via a WWW user interface.

In an embodiment, the alarm function implemented in the invention is an alarm call to an appropriate number, in another embodiment a paging message, and in yet another embodiment a short message. The above-mentioned alarm functions are optional, so in one embodiment the alarm function to be executed is selected on the basis of the safety code. The safety code is preferably removed from the call signalling before the call is directed to the public telephone network.

The invention also concerns a system for the execution of a personal alarm function by means of a telecommunication terminal in a telecommunication system as described above. The system of the invention comprises means for defining a hidden mode in conjunction with a call made from the telecommunication terminal, means in an intelligent network element for verification of mode during the setup of each call, and means for executing an alarm when the mode differs from the defined mode. The system preferably comprises means for defining as the mode the addition of a safety code in conjunction with the dialling of a telephone number.

In a preferred embodiment of the invention, the system comprises means for identifying a safety code entered after a suitable digit. In an embodiment, the system comprises means for identifying a safety code entered before a suitable digit.

In an embodiment of the invention, the hidden mode defined is a traditional call, in other words, the system works logically in a reverse manner as compared with the action described above. In this case, the system comprises means for executing an alarm after the intelligent network element has detected a safety code.

In an embodiment, the system comprises means for activating and deactivating a mode verification function via a telecommunication terminal, in one embodiment via a WWW user interface.

The system may preferably comprise various alarm functions, e.g. an alarm call to an appropriate number, a paging message or a short message. Likewise, several different safety codes defined may exist simultaneously. In one embodiment, the system comprises means for selecting an alarm function based on the safety code. The system preferably comprises means for removing the safety code from the signalling before the call is directed to the public telephone network.

DETAILED DESCRIPTION

In the following, the invention will be described by the aid of a few examples of its embodiments with reference to the attached drawing, which presents a diagram representing an embodiment of the invention.

The procedure and system of the invention can be used to implement a service that allows the user of a terminal 1 to unnoticeably activate an alarm. The terminal may be any type of terminal equipment, such as a mobile telephone, a wired-network telephone, or a data terminal. In the invention, any call that differs from a normal call in a pre-agreed manner will trigger an alarm. The solution is based on a service e.g. in a telecommunication network in which every call made by the subscriber is monitored. If necessary, the service removes the safety code used in the call before passing the call further to the public telephone network. In other words, the call is always connected to a normally called number or to a number as interpreted after safety codes. An alarm is activated if the service detects a deviation from a pre-agreed call mode. For billing purposes, a call record is saved which contains the numbers needed for traffic dispatch without safety codes as well as data indicating whether the service has detected an alarm.

Several pre-agreed call modes can be used. In one solution, each call must contain a safety code to avoid activating an alarm. The safety code may be e.g. a series of digits or other codes, which must be placed before, after or in the middle of the dialled number, or it may be placed after certain digits. In another solution, an alarm is activated if the number contains a certain pre-agreed safety code.

Several types of alarm can be provided. Examples of possible alarm types are alarm call to the police, to a guarding firm, home, a paging message, an electronic mail message, a short message or a combination of these. If several codes are in use, then the user can select a desired alarm type if necessary.

The service can be activated or deactivated by the subscriber. Activation is accomplished by calling an appropriate service number or via a user interface in the WWW.

The invention can be implemented e.g. using intelligent network services (IN, Intelligent Network) or SN/IP base services (SN/IP, Service Node/Intelligent Peripheral).

In the following, an embodiment of the invention in an intelligent network environment will be described with reference to the drawing.

When a service according to the invention is in an active state, the calling subscriber (A-subscriber) (040xxxxxxx) selects the number of the called subscriber (B-subscriber) (09yyyyyyy). The representation of the telephone numbers is only intended as an example and does not signify any definite telephone number or its beginning. The terminal 2 is connected to a service switching point 2. The service switching point 2 (SSP) recognises e.g. from the data in the HLR (home location register) or the subscriber data of a wired-network exchange that the subscriber is an intelligent-network subscriber, and connects the call to the service control point 3 of the intelligent network. The service switching point 2 and the service control point 3 (SCP) communicate using the CorelNAP protocol defined by the ETSI (European Telecommunication Standards Institute). In a DP message as defined by the CorelNAP protocol, the service switching point 2 sends the calling line identity (A-number, CLI, Calling Line Identity) and the digits (B-number) selected by the subscriber to the service control point 3.

The service control point 3 identifies the subscriber on the basis of the calling line identity. If the service logic of the service control point 3 detects that a service according to the invention is active, the service control point 3 will validate the numbers dialled by the caller. If a deviation from a predefined call mode is detected in the validation, then the service control point 3 will execute an alarm function. After the validation, the service logic of the service control point 3 will, if necessary, remove any digits that are superfluous for traffic dispatch in the public telephone network.

The service logic of the service control point 3 returns a routing number (C-number, 09yyyyyyy) to the service switching point 2. In addition to the routing number, billing data (D-number zzzzzzzz) to be added to the call record 5 is transmitted to the service switching point 2. Based on the routing number C, the service switching point 2 connects the call normally to the right address 4. Upon termination of the call, the service switching point 2 produces and saves a corresponding call record which, in addition to the normal data associated with the call, contains the data sent by the service control point 3, i.e. the D-number (zzzzzzzz).

In a SN/IP environment, there is a service node 7 (SN) connected to the telephone exchange 6. Now, using a terminal 1 connected to the telephone exchange via a subscriber line, the caller dials the number of the called party. Based on the data in the HLR in a mobile communication network or the subscriber data in a wired-network exchange, the exchange recognises that the caller is a subscriber to a service as provided by the invention, whereupon it connects the call to the service node 7.

The exchange 6 sends the number of the calling subscriber (A-number, CLI, Calling Line Identity) and the digits dialled (B-number) by the subscriber to the service node 7. The form of signalling between the exchange 6 and the service node 7 may be e.g. as defined in the ISDN user part (ISUP), 30B+D or equivalent. The service node 7 identifies the subscriber on the basis of the A-number (040xxxxxxx). If the service logic of the service node 7 detects that the alarm service is in active state, then the digits dialled by the caller are validated. If the validation shows a deviation from a predefined call mode, then the service node will execute an alarm function. After the validation, the service logic of the service node 7 will, if necessary, remove any digits that are superfluous for traffic dispatch in the public telephone network.

After this, based on the routing number C (09yyyyyyy), the service logic of the service node 7 connects the call in the normal manner to the right address 4. Upon termination of the call, the exchange produces a call record describing the call. If any additional information is to be included in the call record, then the call record 5 must be produced in the service node 7.

A service implemented according to the invention will improve the safety of business executives, cashiers in stores, bank clerks and others who may get into a situation where they are in an emergency but are still able to make a phone call. The service can also be used to announce or report a theft or illicit use of a telephone without the caller becoming aware of the alarm. Besides alarms, the invention can be used e.g. during negotiations for unnoticeable transmission of other information as well in conjunction with a normal call.

The invention is not restricted to the examples of its embodiments described above, but many variations are possible within the scope of the inventive idea defined in the claims.

What is claimed is:

1. Procedure for executing a personal alarm function by means of a telecommunication terminal in a telecommunication system comprising a telephone network, a telephone exchange connected to the telephone network, an intelligent network element connected to the telephone network and a telecommunication terminal connected to the telephone network, wherein a hidden mode is defined in conjunction with a call made from the telecommunication terminal, the mode is verified in the intelligent network element in conjunction with the setup of each call and an alarm function is executed when the mode differs from the defined mode, wherein the call made is connected while the alarm function executes.

2. Procedure as defined in claim 1, wherein the mode is defined as the addition of a safety code in conjunction with the dialling of a telephone number.

3. Procedure as defined in claim 1, wherein the safety code is entered after a suitable digit.

4. Procedure as defined in claim 1, wherein the safety code is entered before a suitable digit.

5. Procedure as defined in claim 1, wherein an alarm is executed after the intelligent network element has detected a safety code.

6. Procedure as defined in claim 1, wherein the verification of mode is activated and deactivated by means of the telecommunication terminal or via a WWW user interface.

7. Procedure as defined in claim 1, wherein the alarm function is comprised in one of the following categories:

alarm call to an appropriate telephone number, paging message, short message, electronic mail message.

8. Procedure as defined in claim 1, wherein the function to be executed is selected on the basis of the safety code.

9. Procedure as defined in claim 1, wherein the safety code is removed from the call signalling before the call is directed to the public telephone network.

10. System for executing a personal alarm function by means of a telecommunication terminal in a telecommunication system comprising a telephone network, a telephone exchange connected to the telephone network, an intelligent network element connected to the telephone network and a telecommunication terminal connected to the telephone network, the system comprising:

means for defining a hidden mode in conjunction with a call made from the telecommunication terminal;

means in the intelligent network element for verification of mode in conjunction with the setup of each call; and means for executing an alarm function when the mode differs from the defined mode, wherein the call made is connected while the alarm function executes.

11. System as defined in claim 10, wherein the system comprises means for defining as the mode the addition of a safety code in conjunction with the dialling of a telephone number.

12. System as defined in claim 10, wherein the system comprises means for identifying a safety code supplied after a suitable digit.

13. System as defined in claim 10, wherein the system comprises means for identifying a safety code supplied before a suitable digit.

14. System as defined in claim 10, wherein the system comprises means for executing an alarm function after the intelligent network element has detected a safety code.

15. System as defined in claim 10, wherein the system comprises means for activating and deactivating a mode verification function by means of the telecommunication terminal or via a WWW user interface.

16. System as defined in claim 10, wherein the alarm function is comprised in one of the following categories: alarm call to an appropriate telephone number, paging message, short message, electronic mail message.

17. System as defined in claim 10, wherein the system comprises means for selecting the alarm function to be executed on the basis of the safety code.

18. System as defined in claim 10, wherein the system comprises means for removing the safety code from the call signalling before the call is directed to the public telephone network.

* * * * *